(12) United States Patent
Ferris (10) Patent No.: US 10,021,943 B2
(45) Date of Patent: Jul. 17, 2018

(54) VARIABLE ORNAMENT ASSEMBLY

(71) Applicant: Mashannon Ferris, Costa Mesa, CA (US)

(72) Inventor: Mashannon Ferris, Costa Mesa, CA (US)

( * ) Notice: Subject to any disclaimer, the term of this patent is extended or adjusted under 35 U.S.C. 154(b) by 113 days.

(21) Appl. No.: 14/849,414

(22) Filed: Sep. 9, 2015

(65) Prior Publication Data

US 2016/0066656 A1    Mar. 10, 2016

Related U.S. Application Data

(60) Provisional application No. 62/096,752, filed on Dec. 24, 2014, provisional application No. 62/048,438, filed on Sep. 10, 2014.

(51) Int. Cl.

| | | |
|---|---|---|
| *A44B 1/04* | (2006.01) | |
| *F16B 1/00* | (2006.01) | |
| *A44B 1/38* | (2006.01) | |
| *A44B 1/14* | (2006.01) | |
| *A44C 3/00* | (2006.01) | |
| *A44C 17/02* | (2006.01) | |
| *G02C 11/02* | (2006.01) | |

(52) U.S. Cl.
CPC ............... *A44B 1/04* (2013.01); *A44B 1/14* (2013.01); *A44B 1/38* (2013.01); *A44C 3/00* (2013.01); *A44C 17/0208* (2013.01); *G02C 11/02* (2013.01); *A44D 2203/00* (2013.01); *F16B 2001/0035* (2013.01); *G02C 2200/02* (2013.01)

(58) Field of Classification Search
CPC .... A44B 1/04; A44B 1/38; A44B 1/14; A44C 3/00; A44C 17/0208; A44D 2203/00; G02C 11/02; G02C 2200/02; F16B 2001/0035
See application file for complete search history.

(56) References Cited

U.S. PATENT DOCUMENTS

| | | | |
|---|---|---|---|
| 2,752,764 A * | 7/1956 | Lederer | ................. A44C 7/002 24/303 |
| 4,700,436 A | 10/1987 | Morita | |
| 7,341,342 B2 | 3/2008 | Jain | |
| 7,524,052 B2 | 4/2009 | Esses | |
| 7,591,554 B2 | 9/2009 | Guerrero | |

(Continued)

FOREIGN PATENT DOCUMENTS

| | | |
|---|---|---|
| CN | 1700867 | 11/2005 |
| CN | 100355377 | 12/2007 |

(Continued)

OTHER PUBLICATIONS

First4magnets; www.first4magnets.com; 15mm dia x 5mm thick N42 Neodymium Magnet with 2mm Diameter Hole—4.1kg Pull; Dec. 7, 2015.

(Continued)

*Primary Examiner* — Robert Sandy
*Assistant Examiner* — Louis A Mercado
(74) *Attorney, Agent, or Firm* — Fish IP Law, LLP (57) ABSTRACT

Ornament assemblies including a fastener, and a removable and replaceable ornament are provided. Contemplated fasteners include a magnet and a looped attachment mechanism, and are configured to simultaneously couple with an ornament via the magnet, and an accessory via the looped attachment mechanism.

18 Claims, 10 Drawing Sheets

(56) References Cited

U.S. PATENT DOCUMENTS

| | | | |
|---|---|---|---|
| 7,874,669 B2 | 1/2011 | Moritz et al. | |
| 7,914,143 B2 | 3/2011 | Heim | |
| 8,123,351 B2 | 2/2012 | Moritz et al. | |
| 8,545,011 B2 | 10/2013 | Chow | |
| 8,549,879 B2 | 10/2013 | Mellinger et al. | |
| 2004/0111005 A1* | 6/2004 | Lu | A44C 11/002 600/15 |
| 2004/0255501 A1* | 12/2004 | Lawrence | G02C 11/00 40/665 |
| 2008/0264522 A1 | 10/2008 | Conway | |
| 2010/0192631 A1* | 8/2010 | Richmond | A44C 25/002 63/23 |
| 2012/0131953 A1* | 5/2012 | Fahsel | A44C 17/0208 63/29.2 |
| 2013/0160491 A1 | 6/2013 | Hendrick | |

FOREIGN PATENT DOCUMENTS

| | | |
|---|---|---|
| CN | 201231014 | 5/2009 |
| CN | 100559987 | 11/2009 |
| DE | 3919476 | 12/1989 |
| EP | 1408786 | 2/2008 |
| JP | 09179077 | 7/1997 |
| JP | 4567331 | 10/2010 |

OTHER PUBLICATIONS

Ficklets; www.ficklets.com; Eyewear & Sunglass Huggie Charms; attaching instructions; Dec. 7, 2015.

Ficklets; www.ficklets.com; Eyewear & Sunglass Huggie Charms; product category; Dec. 7, 2015.

\* cited by examiner

VARIABLE ORNAMENT ASSEMBLY

This application claims priority to U.S. provisional patent application Nos. 62/048,438 filed on Sep. 10, 2014, and 62/096,752 filed on Dec. 24, 2014. These and all other extrinsic materials identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is ornament assemblies.

BACKGROUND

The background description includes information that may be useful in understanding the present invention. It is not an admission that any of the information provided herein is prior art or relevant to the presently claimed invention, or that any publication specifically or implicitly referenced is prior art.

Some efforts have been placed in providing decorative items that can be placed on accessories such as eyeglasses. For example, U.S. Pat. No. 7,591,554 teaches a removable eyeglass charm. However, the '554 patent's charm includes a fastener that is integral with the charm, and thus the charm and fastener must be removed and replaced together. Furthermore, the fastener is apparently only suitable for coupling the charm with an arm of eyewear, and not for other accessories having different dimensions.

Thus, there is still a need for improved ornament assemblies.

SUMMARY OF THE INVENTION

The inventive subject matter provides an ornament assembly comprising a fastener that is configured to simultaneously couple with an ornament and an accessory. In some embodiments, the fastener could be configured such that the ornament could be replaced with one or more different ornaments, preferably without any damage to the fastener or ornament. Additionally or alternatively, the fastener could be configured to be removed from the accessory and coupled with a different accessory of the same or different size, again preferably without any damage to the fastener or the accessory.

Some contemplated fasteners include a magnet that is partially or completely enclosed in an enclosure material such as silicone rubber. It should be appreciated that the casing or enclosure material could comprise silicone, rubber, plastic, or any suitable material, but is preferably thin (e.g., less than 200% the thickness of the magnet, less than 150% the thickness of the magnet, less than 100% the thickness of the magnet) to allow the fastener to magnetically couple with the ornament.

A fastener could also include an attachment mechanism that is sized and dimensioned to receive at least a portion of one or more accessories such as eyewear arms, belts and bracelets. The magnet could be used to provide a magnetic coupling with one or more ornaments such as bottle caps, jewelry ornaments, or any other suitable ornamental object made at least in part of a ferromagnetic material.

Viewed from another perspective, the inventive subject matter provides a variable ornament assembly comprising a fastener (e.g., a magnet), at least one ornament (e.g., a cap) that removably couples with the fastener, and an attachment mechanism that removably couples the fastener to an accessory (e.g., an eyeglass stem or arm). As used herein, an object that "removably couples" to another object does so in a non-destructively removable manner.

In some aspects of the inventive subject matter, the fastener is a disc-shaped magnet and includes a through-hole (e.g., radially) sized and dimensioned to receive the attachment mechanism. In a preferred embodiment, the ornament comprises a first material (e.g., a ferromagnetic metal), and the fastener and ornament can be magnetically coupled with one another. Additionally or alternatively, the attachment mechanism includes or forms one or more loops, which includes a first end, a central portion and a second end. Preferably, the first and second ends are each sized and dimensioned to receive at least a portion of an accessory when the central portion is disposed within the through-hole.

The through-hole can have any diameter suitable for receiving a suitable attachment mechanism. For example, a diameter of a through-hole can be between 0.5 mm and 20 mm, between 0.5 mm and 10 mm, between 0.5 mm and 5 mm, and most preferably between 1 mm and 3 mm. Where the magnet is at least partially enclosed in a casing, the magnet and the casing could comprise a through-hole. For example, the attachment mechanism can comprise a casing that partially or entirely encloses the fastener (e.g., magnet), and two loop ends extending from the casing.

In an alternative embodiment, the casing and magnet could lack a through-hole and the casing could include or be coupled to one or more loops sized and dimensioned to receive an accessory.

All attachment mechanisms suitable for removably coupling the fastener to any suitable accessory (e.g., eyewear, bracelet, belt, shoelace, etc.) are contemplated. In some contemplated embodiments, an attachment mechanism is a looped band or loop, for example an elastic or inelastic band. Where the attachment mechanism is disposed through a hole of the fastener, it is generally preferred that the portion of the attachment mechanism passing through a fastener's through-hole has a diameter that is no more than 125%, more preferably no more than 120%, or even more preferably no more than 110% of the thickness of the attachment mechanism.

An ornament of the inventive subject matter can be made of any suitable material(s). Where a fastener comprises a magnet (in whole or in part), it is preferred that the ornament comprises a ferromagnetic material (in whole or in part) to allow for a magnetic coupling of the ornament to the fastener. For example, the ornament could be a metal cap (e.g., a bottle cap).

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figures 1A, 1C:
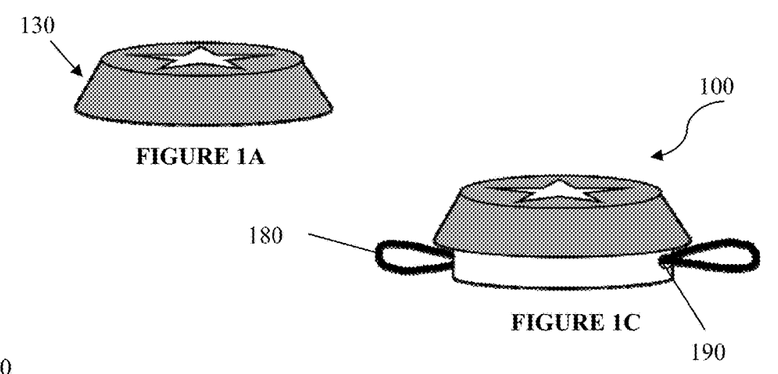
FIGS. 1A-1C illustrate an embodiment of an ornament assembly.
Figure 1B:
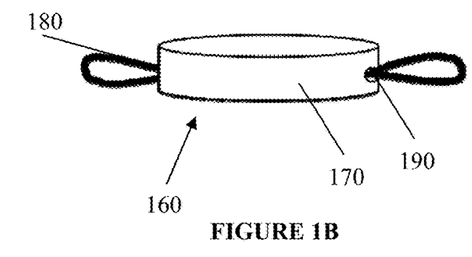

FIGS. 1A-1C shows an embodiment of a variable ornament assembly 100 of the inventive subject matter having an ornament 130 and a fastener 160. Here, fastener 160 comprises a magnet 170, an attachment mechanism 180, and a through-hole 190 sized and dimensioned to receive the attachment mechanism 180. The ornament 130 comprises a material (that may or may not be different than the material of the fastener—e.g., a magnet, a metal) that allows for a magnetic coupling of the ornament and the magnet. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, it is contemplated that the magnet 170 could be partially or fully enclosed in a casing as further described below. The casing may or may not be magnetic or ferromagnetic and may comprise plastic, wood, leather, metal, ceramic, glass, rubber, silicone, silicone rubber, or another commercially suitable material(s). The casing could act as a buffer to reduce or control the magnetic attraction between the magnet and an ornament or other object.

As used herein, a magnet can partially or fully comprise a permanent or a temporary magnet. Permanent magnets partially or fully comprise a ferromagnetic metal or ferromagnetic metal alloy, such as nickel, iron, neodymium, magnetite, steel, aluminum-nickel-cobalt, neodymium-iron-boron, samarium-cobalt, strontium-iron, or any other ferromagnetic metal or ferromagnetic alloy. Temporary magnets include electromagnets, solenoids, or other magnets that are magnetized by a magnetic field produced by an electric current.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Figure 2A:
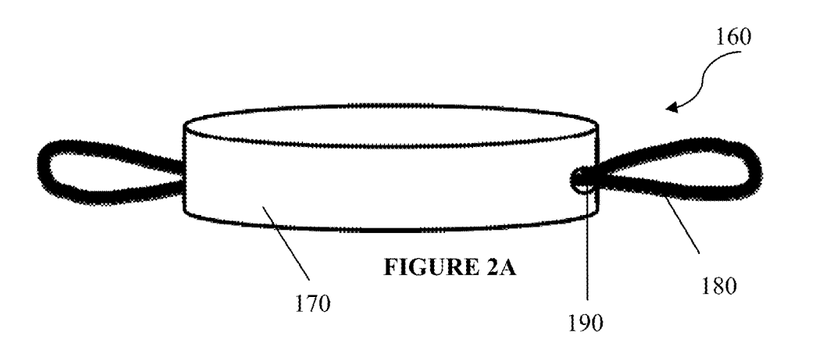
FIGS. 2A-2B illustrate the fastener of the ornament assembly of FIGS. 1A-1C.
Figure 2B:
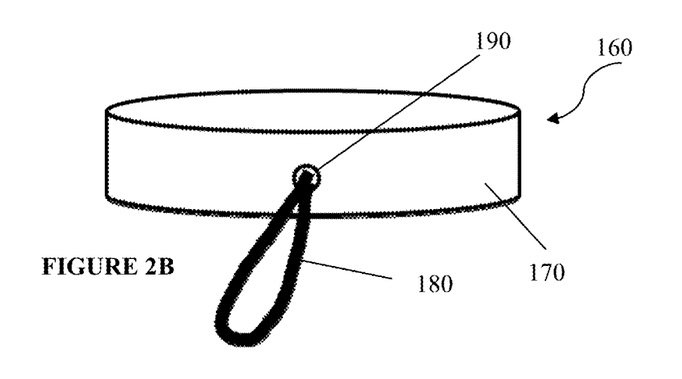

FIGS. 2A-2B provide further views of fastener 160. Fastener 160 comprises a magnet 170, an attachment mechanism 180, and a through-hole 190. The through-hole 190 is sized and dimensioned to receive the attachment mechanism 180. In some contemplated embodiments, contemplated fasteners could additionally or alternatively comprise a partial hole or recess that extends only partially through a dimension of the magnet. Alternatively or additionally, a partial or through-hole can extend partially or completely through a dimension of a casing (where included). It should also be appreciated that a fastener of the inventive subject matter can include a plurality of partial holes or through-holes.

In some embodiments, the partial hole(s) or through-hole(s) can have a diameter of between 0.5 mm and 5 mm, inclusive, more preferably between 1 mm and 4 mm, inclusive, and most preferably between 2 mm and 3 mm, inclusive. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein, a "hole" includes any aperture, opening, gap, space, indentation, or perforation that is sized-and dimensioned to receive at least a portion of an attachment mechanism.

In some embodiments, a fastener could includea casing that encloses a magnet, and includes one or more looped portions that are sized and dimensioned to receive an accessory. The attachment mechanisms (e.g., looped material, etc.) can be composed of different materials with different thicknesses depending on the contemplated ornament(s) and accessory. In preferred embodiments, the thickness of a portion of the attachment mechanism that passes through or within a hole of a fastener—in relation to a diameter of the hole—is preferably at least 0.75:1, more preferably at least 0.85:1, and most preferably at least 0.90:1. Viewed from a different perspective, where a diameter of a fastener hole is 5 mm, it is generally preferred that the portion of an attachment mechanism (e.g., rubber band) that passes through the hole has a thickness that is at least 3.75 mm, more preferably at least 4.25 mm, and most preferably at least 4.5 mm. In some embodiments, for example where the attachment mechanism comprises a looped material, it is contemplated that the "thickness" of the portion passing through a fastener hole would be twice as large as a thickness of the same material if unlooped.

Figure 3A:
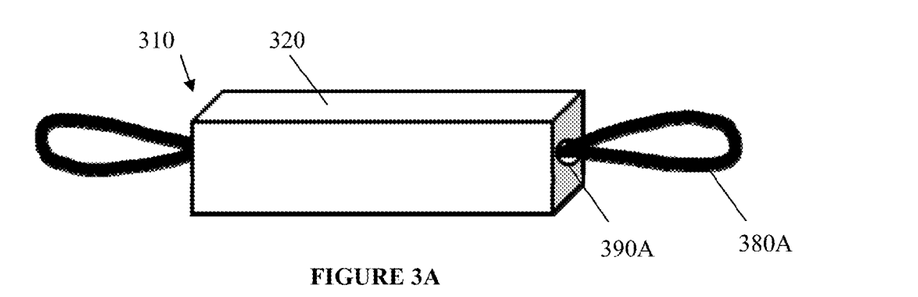
FIGS. 3A-3B illustrate some exemplary fasteners of the inventive subject matter.
Figure 3B:
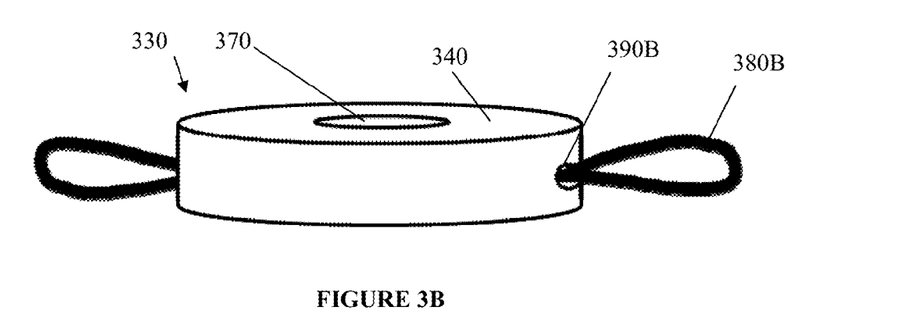
Figures 4A, 4B:
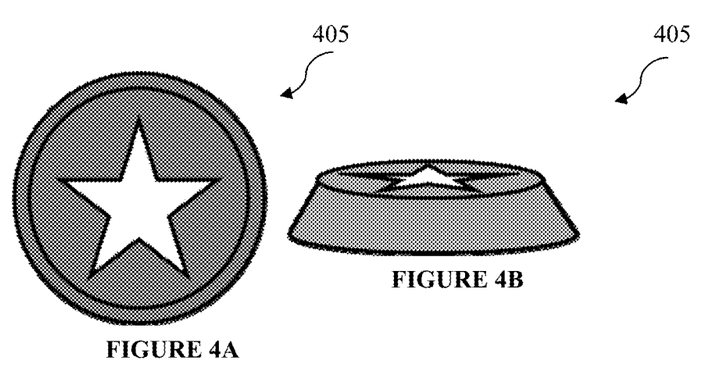
FIGS. 4A-4D illustrate some exemplary ornaments of the inventive subject matter.
Figures 4C, 4D:
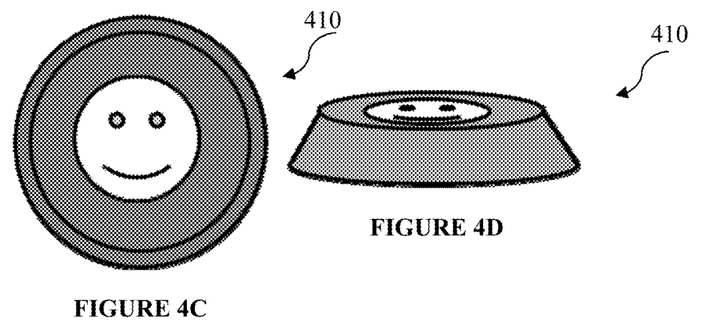

A fastener of the inventive subject matter could comprise any suitable regular or irregular shape, including for example, a cylinder (e.g., a disc), a sphere, a cube, a tetrahedron, a trapezoidal prism, etc. For example, FIG. 3A shows a rectangular cube-shaped fastener 310 comprising a magnet 320, an attachment mechanism 380A, and a through-hole 390A. FIG. 3B shows a disc-shaped fastener 330 with a small magnet 370 partially enclosed or encased in a casing 340 with a through-hole 390B extending through the magnet and the casing, and an attachment mechanism 380B. As shown in FIG. 3B, the through-hole may extend radially through a diameter of the fastener.

In some embodiments, the attachment mechanism can be a part of a casing that partially or entirely encloses the fastener. For example, the attachment mechanism could comprise two loops that are a part of, and extend from, the casing. Such an embodiment may be advantageous as it could simplify manufacturing by eliminating the need for a through-hole. Also, this embodiment could reduce the number of parts required by incorporating the attachment mechanism as part of the casing. It is contemplated that the casing can comprise silicone, plastic, rubber, nylon, or any other suitable material that is of sufficient thinness to allow the magnet enclosed to fasten with an ornament.

In FIGS. 4A-4D, two ornaments 405 and 410 are shown having different designs. Ornaments 405 and 410 are made at least in part of a metal that is ferromagnetic. However, it should also be appreciated that fasteners and ornaments could removably couple to one another in any suitable manner. For example, the fastener and ornament could comprise complementary hook and loop fasteners, snaps, button and buttonhole, or any other suitable coupling mechanisms.

Ornaments 405 and 410 are caps, and could be made of a plastic, a ceramic, a wood, a metal, a leather, a fabric, or any other commercially suitable material(s). A plurality of ornaments with a plurality of designs could be provided and used with the same fastener, which could allow the user to change a design of an assembly by switching out an ornament as desired. As used herein, the term "design" includes any drawing, sketch, pattern, motif, diagram, picture, photo, logo, character, letter, etc. and may be etched or drawn directly on the ornament or may be attached via adhesive means (e.g. a sticker). As used herein, the term "ornament" should be interpreted broadly to include, among other things, a charm, a bauble, a trinket, a decoration, an adornment, an embellishment, or other suitable item.

Figure 5A:
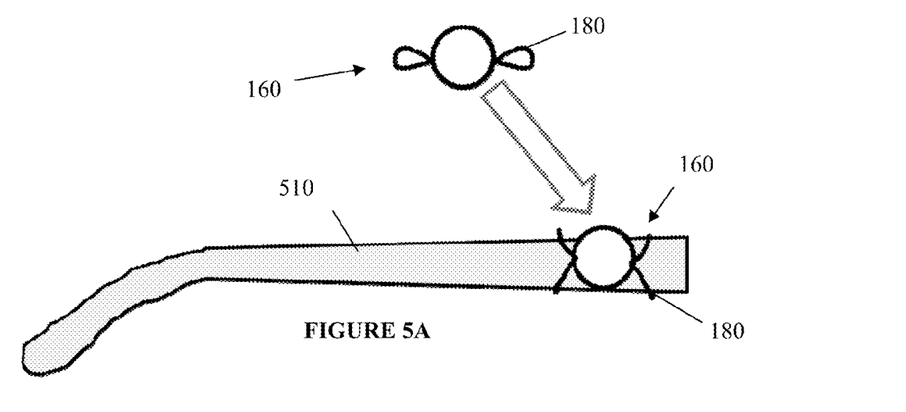
FIGS. 5A-5B illustrate the ornament assembly of FIGS. 1A-1C on an accessory.
Figure 5B:
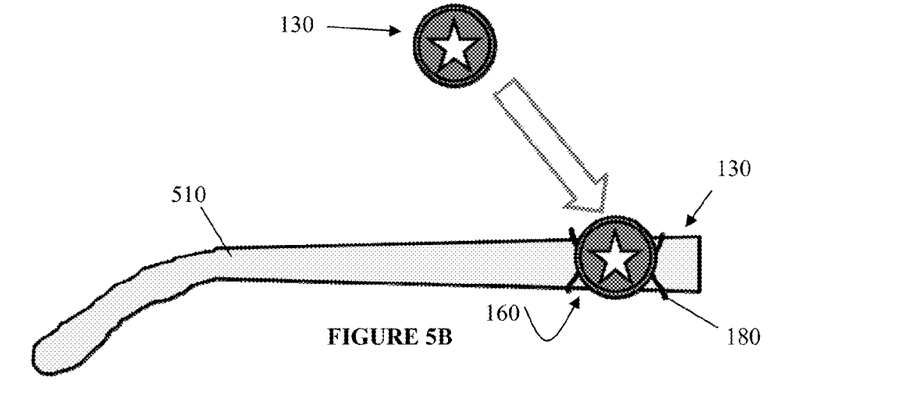

FIGS. 5A-5B illustrate a fastener being attached to an accessory, and an ornament being placed on the fastener. Here, fastener 160 is attached to the accessory, in this case an arm 510 of a pair of glasses, via attachment mechanism 180. In embodiments where attachment mechanism is looped, arm 510 can extend through the loops of attachment mechanism 180. In some other contemplated embodiments, attachment mechanism 180 may be tied to arm 510. Ornament 130 can be magnetically attached to fastener 160, and may be removed and replaced with another ornament of a different color, dimension, shape, or design without removing fastener 160 from arm 510.

Figure 6:
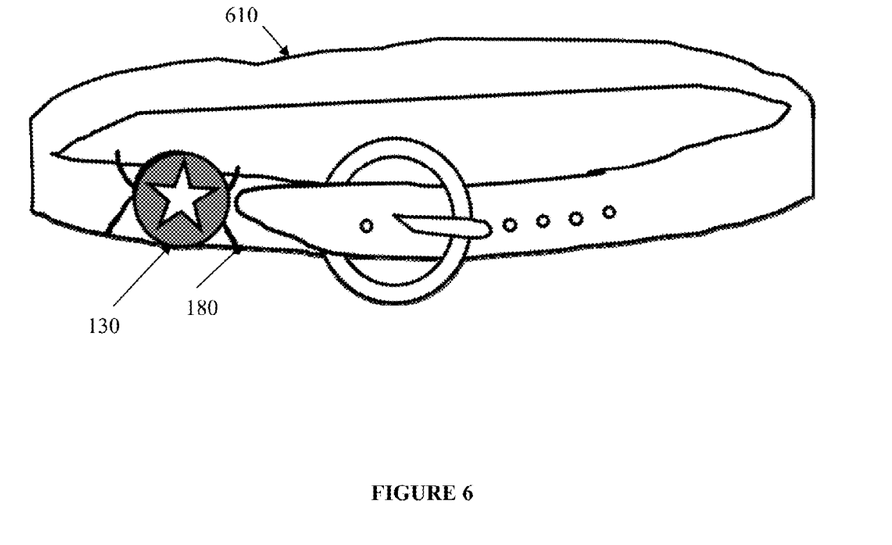
FIG. 6 illustrates the ornament assembly of FIGS. 1A-1C on another accessory.
Figure 7A:
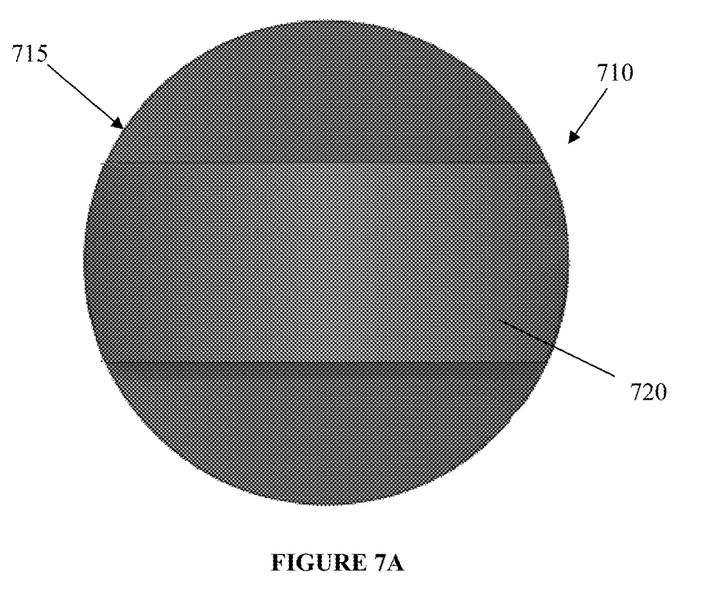
FIGS. 7A-7D illustrate another fastener of the inventive subject matter.
Figure 7B:
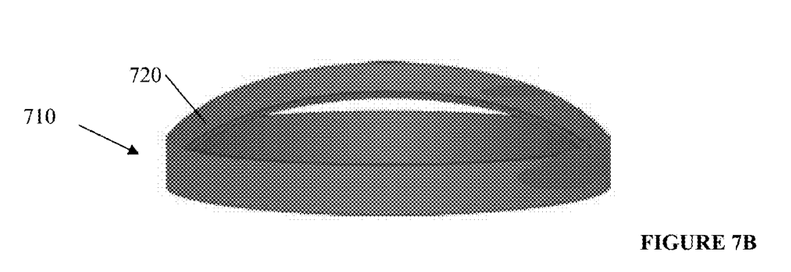
Figure 7C:
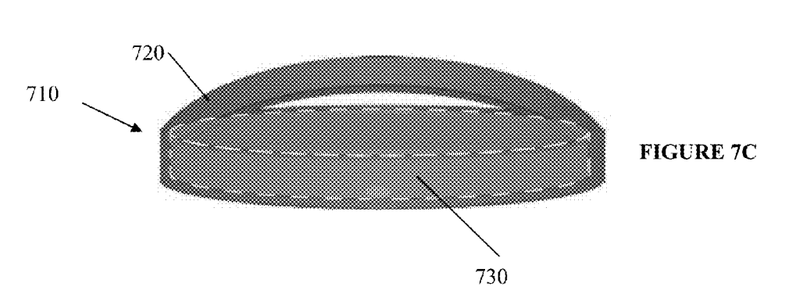
Figure 7D:
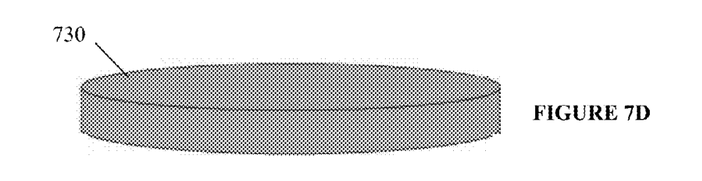

As used herein, an accessory includes any article or item that can be carried or worn, for example, to complement a garment or outfit. Contemplated accessories include, but are not limited to eyewear, bracelets, necklaces, earrings, belts, scarves, shoelaces, shoes, tools, frames, furniture items (e.g., lamps, tables, chairs), cables, writing utensils, pet collars, and bags (e.g., tote bags, cross-body bag straps, backpacks). For example, FIG. 6 illustrates an ornament assembly having an ornament 130, a fastener (not shown) and attachment mechanism 180 coupled to a belt.

FIGS. 7A-7D illustrate another contemplated fastener of the inventive subject matter, which could be used with any suitable ornaments and accessories as described above and below.

Fastener 710 includes a magnet 730 that is completely enclosed in a casing 715. Casing 715 is coupled with a looped portion 720 such that the casing and looped portion define an opening sized and dimensioned to receive one or more accessories. In some preferred embodiments, the casing is made of a silicone, a rubber, or a silicone rubber, and is at least partially elastic to accommodate accessories of different sizes and shapes. Additionally or alternatively, the casing and the looped portion could be made of a single piece of material. Additionally or alternatively, the casing could comprise an aperture through which the magnet 730 could be received.

Magnet 730 is disc-shaped, and could have any suitable thickness and diameter. For example, the magnet could have a thickness of greater than 10 mm, greater than 15 mm, greater than 20 mm, less than 15 mm, less than 10 mm, less than 5 mm, between 1-25 mm, between 3-15 mm, between 3-5 mm, or any other suitable thickness. Additionally or alternatively, the magnet could have a diameter of greater than 20 mm, greater than 25 mm, greater than 30 mm, less than 25 mm, less than 20 mm, less than 15 mm, between 1-50 mm, between 10-20 mm, between 13-17 mm, or any other suitable diameter. Additionally or alternatively, the magnet could have a diameter to thickness ratio of between 1:1 and 1:5, between 5:1 and 1:1, between 4:1 and 2:1, or between 3.5:1 and 2.5:1, or any other suitable ratio. It is contemplated that the shape, size and dimensions could vary depending on the size and shape of the ornament, the size and shape of the ornament's fastener receiving portion or the size and shape of the accessory to be received by the attachment mechanism. Viewed from another perspective, a magnet for use with fastener 710 does not need to be disc-shaped, and could comprise any suitable shape (e.g., spherical, triangular prism, rectangular prism, an ellipsoid).

Figure 8:
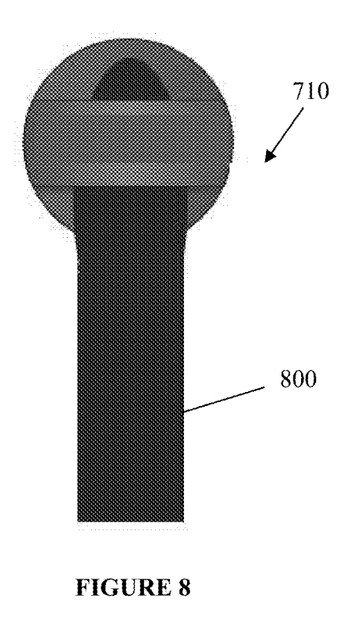
FIG. 8 illustrates the fastener of FIGS. 7A-7D on an accessory.

FIG. 8 illustrates fastener 710 coupled to an arm 800 of a pair of eyeglasses. In some embodiments, fastener 710 could be sized and dimensioned to alternatively or additionally couple with one or more other accessories.

Figure 9A:
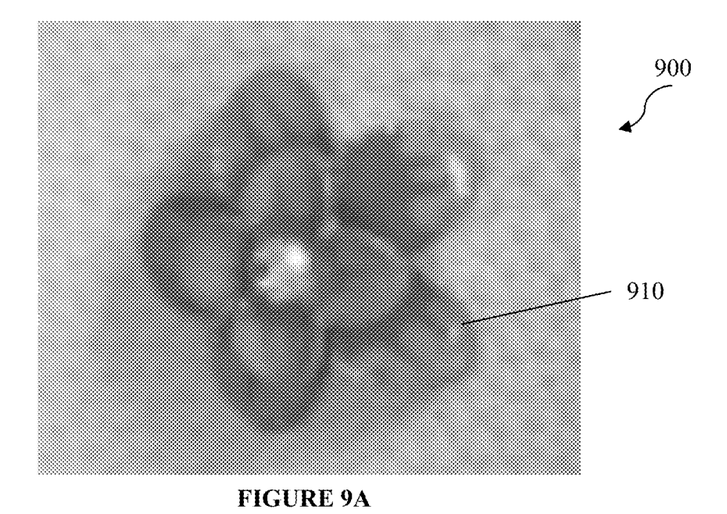
FIGS. 9A-9B illustrate another ornament of the inventive subject matter, which could be used with a fastener of the inventive subject matter.
Figure 9B:
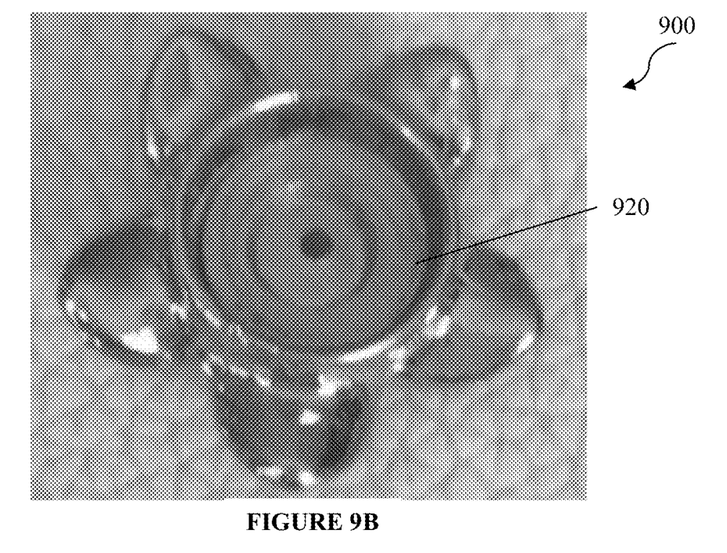

FIGS. 9A-9B illustrate an ornament 900 that could be used in conjunction with fastener 710 (or any other suitable fastener as described herein), which includes decorative elements 910 and a fastener accepting portion 920, here a disc-shaped recess. It should be appreciated that the fastener accepting portion 920 could be sized and dimensioned to partially or entirely extend over the side-wall(s) of the fastener. Viewed from another perspective, the disc-shaped recess could have a depth that is less than, equal to or greater than the width of the fastener enclosure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An ornament assembly, comprising:
    a fastener comprising:
        a magnet completely enclosed in a first enclosure; and
        an attachment mechanism, wherein the first enclosure and the attachment mechanism define a looped opening sized and dimensioned to receive at least a portion of a first accessory;
    a first ornament comprising a first material;
    wherein the fastener is configured to removably couple with the first ornament via a magnetic coupling; and
    wherein the first enclosure is at least partially postioned between the magnet and the first ornament.

2. The assembly of claim 1, wherein the first enclosure comprises a silicone.

3. The assembly of claim 1, wherein the magnet comprises a disc shaped neodymium magnet.

4. The assembly of claim 3, wherein the magnet has a thickness of less than 5mm, and a diameter of less than 15mm.

5. The assembly of claim 1, wherein the ornament comprises a fastener accepting portion that is sized and dimensioned to extend at least partially over the first enclosure.

6. The assembly of claim 1, wherein the magnet is disc shaped, and wherein the magnet has a diameter to thickness ratio of between 4:1 and 2:1.

7. The assembly of claim 6, wherein the diameter to thickness ratio is approximately 3:1.

8. The assembly of claim 1, wherein the first ornament comprises a disc shaped recess.

9. The assembly of claim 8, wherein the disc shaped recess has a depth that is greater than a width of the first enclosure.

10. The assembly of claim 1, wherein the first material comprises a metal.

11. The assembly of claim 1, further comprising a second ornament, wherein the fastener is further configured to removably couple with the second ornament via a second magnetic coupling.

12. The assembly of claim 1, wherein the attachment mechanism is further sized and dimensioned to receive at least a portion of a second accessory, and wherein at least one of the first and second accessories comprises an eyeglass arm.

13. An ornament assembly, comprising:
a magnet fastener, and a hole extending through a thickness of the magnet, the hole being is sized and dimensioned to receive at least a portion of an attachment mechanism;
a first ornament comprising a first material;
wherein the fastener and first ornament are removably coupled with one another via a magnetic coupling of the magnet fastener and the first material; and
wherein the attachment mechanism comprises a first loop having a first end, a second end and a central portion, and wherein the first and second ends are each sized and dimensioned to receive at least a portion of an accessory when the central portion is disposed in the hole of the magnet fastener.

14. The assembly of claim 13, wherein the magnet fastener is disc shaped, and wherein the thickness of the fastener is between 2-4mm.

15. The assembly of claim 14, wherein the magnet fastener has a length of less than 15mm.

16. The assembly of claim 13, wherein the magnet fastener is disc shaped, and has a length to thickness ratio of between 4:1 and 2:1.

17. The assembly of claim 13, wherein the first loop comprises a rubber band.

18. An ornament assembly, comprising:
a fastener comprising:
a magnet at least partially enclosed in a first enclosure; and
an attachment mechanism sized and dimensioned to receive at least a portion of a first accessory, wherein the attachment mechanism comprises a loop, and wherein the first enclosure and the loop are made of a single piece of material;
a first ornament comprising a first material; and
wherein the fastener is configured to removably couple with the first ornament via a magnetic coupling.

* * * * *